(12) United States Patent
Hu et al.

(10) Patent No.: US 7,848,485 B2
(45) Date of Patent: Dec. 7, 2010

(54) TRAILER SECURITY INSPECTION SYSTEM

(75) Inventors: Haifeng Hu, Beijing (CN); Zhiqiang Chen, Beijing (CN); Yuanjing Li, Beijing (CN); Chuanxiang Tang, Beijing (CN); Hua Peng, Beijing (CN); Zhizhong Liang, Beijing (CN); Zhongrong Yang, Beijing (CN); Shangmin Sun, Beijing (CN); Yaohong Liu, Beijing (CN); Jinyu Zhang, Beijing (CN); Qingjun Zhang, Beijing (CN); Haitao Jiang, Beijing (CN); Yanli Deng, Beijing (CN); Xiang'an Qi, Beijing (CN); Meng Wang, Beijing (CN); Haihong Sun, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 51 days.

(21) Appl. No.: 12/274,932

(22) Filed: Nov. 20, 2008

(65) Prior Publication Data
US 2009/0136004 A1      May 28, 2009

(30) Foreign Application Priority Data
Nov. 20, 2007      (CN) ..................... 2007 1 0177749

(51) Int. Cl.
*G01N 23/04*   (2006.01)
*H05G 1/02*    (2006.01)
*G01T 7/08*    (2006.01)
(52) U.S. Cl. ........................................ 378/57; 378/208
(58) Field of Classification Search .................. 378/57,
378/68, 69, 204, 208, 210
See application file for complete search history.

(56) References Cited

U.S. PATENT DOCUMENTS

| 3,880,456 | A  | * | 4/1975  | DeRoshia ................. 294/81.2 |
| 4,599,740 | A  | * | 7/1986  | Cable ......................... 378/57 |
| 6,652,214 | B1 | * | 11/2003 | Barry ......................... 414/337 |
| 6,922,461 | B2 | * | 7/2005  | Kang et al. ................... 378/57 |
| 7,207,713 | B2 | * | 4/2007  | Lowman ..................... 378/198 |
| 7,258,485 | B2 | * | 8/2007  | Nakano et al. ............. 378/205 |
| 7,267,239 | B2 | * | 9/2007  | Takehara et al. ........... 212/270 |
| 7,302,035 | B2 | * | 11/2007 | Hu et al. ..................... 378/57 |
| 7,497,618 | B2 | * | 3/2009  | Chen et al. ................ 378/198 |
| 7,517,149 | B2 | * | 4/2009  | Agrawal et al. ............ 378/198 |

(Continued)

FOREIGN PATENT DOCUMENTS

CN      1405555      3/2003

(Continued)

OTHER PUBLICATIONS

International Search Report dated Feb. 5, 2009 issued in corresponding PCT Application No. PCT/CN2008/001798.

(Continued)

*Primary Examiner*—Edward J Glick
*Assistant Examiner*—Anastasia Midkiff
(74) *Attorney, Agent, or Firm*—Kenyon & Kenyon LLP

(57) ABSTRACT

For a radiation imaging inspection system, apparatus, and/or method, the system, particularly a trailer security inspection system, includes a protective wall forming an inspection passage for passage of a trailer, a radiation imaging system effecting security inspection of the trailer passing through the inspection passage, and a fraction arrangement for hauling the trailer.

20 Claims, 6 Drawing Sheets

U.S. PATENT DOCUMENTS

| | | | |
|---|---|---|---|
| 7,600,386 B2* | 10/2009 | Saito et al. | 62/6 |
| 2004/0017887 A1 | 1/2004 | Le et al. | |
| 2004/0141584 A1 | 7/2004 | Bernardi et al. | |
| 2004/0146371 A1 | 7/2004 | Li et al. | |
| 2004/0179647 A1 | 9/2004 | Zhao et al. | |
| 2004/0258198 A1 | 12/2004 | Carver et al. | |
| 2005/0244254 A1* | 11/2005 | Schratt et al. | 414/281 |
| 2006/0008052 A1* | 1/2006 | Elyan et al. | 378/57 |
| 2006/0056584 A1* | 3/2006 | Allman et al. | 378/57 |
| 2006/0113163 A1 | 6/2006 | Hu et al. | |
| 2006/0269042 A1* | 11/2006 | Muhanna et al. | 378/57 |
| 2008/0205594 A1* | 8/2008 | Bjorkholm | 378/53 |
| 2009/0174966 A1* | 7/2009 | Przygodda | 360/244.2 |
| 2010/0028099 A1* | 2/2010 | Sun et al. | 410/67 |

FOREIGN PATENT DOCUMENTS

| | | |
|---|---|---|
| CN | 1500685 | 6/2004 |
| CN | 2670279 | 1/2005 |
| CN | 1607386 | 4/2005 |
| JP | 2003-119000 | 4/2003 |
| JP | 2004-001597 | 1/2004 |
| JP | 2004-161430 | 6/2004 |
| JP | 2005-255362 | 9/2005 |

OTHER PUBLICATIONS

Great Britain Search Report dated Feb. 26, 2009 issued in corresponding GB Application No. GB0820338.2.

* cited by examiner

TRAILER SECURITY INSPECTION SYSTEM

FIELD OF THE INVENTION

The present invention relates to a radiation imaging inspection system, particularly to a trailer security inspection system.

BACKGROUND INFORMATION

A trailer (or connected cars) is used to haul luggage and goods at the Customs House, airports, or railway stations. The trailer can include a tractor as a motive power source and a plurality of flatcars or compartments hooked together in series hauled by the tractor. Radiation imaging inspection is often a requisite inspection means for the Customs House, airports and railway stations. The radiation imaging inspection refers to an inspection performed via an inspection passage including shielding rays, a radiation source, and an array detector which can receive the rays having permeated an inspected vehicle, where the inspected vehicle is hauled by a special traction means through the radiation beam for inspection. The inspection system usually comprises an accelerator system, a detector system, an image data acquisition system, a scanning device, and an operation & inspection system. In the prior technology, there are X-ray inspection devices for inspecting a passenger's luggage, and special inspection apparatuses for inspecting freight vehicles or container trucks. At present, there is not an inspection apparatus specially for inspecting a trailer.

SUMMARY OF THE INVENTION

An object of the present invention is to overcome the drawbacks of the above prior technology and to provide a trailer security inspection system for inspecting goods loaded on a trailer by using a radiation imaging principle under the condition that the case containing the goods is not opened.

To achieve the above object, an example embodiment of the present invention adopts the following technical solution. The trailer security inspection system according to an example embodiment of the present invention comprises a protective wall forming an inspection passage for passage of the trailer, a radiation imaging system effecting security inspection of the trailer passing through said inspection passage, and a traction arrangement for hauling the trailer.

Furthermore, in an example embodiment, said trailer security inspection system further comprises an accelerator cabin for mounting an accelerator of said radiation imaging system and a horizontal detector arm and a vertical detector arm for mounting detector modules of said radiation imaging system, where one end of the horizontal detector arm is connected to a top of the accelerator cabin, and the other end thereof is connected to an upper end of the vertical detector arm.

Furthermore, a window of the horizontal detector arm from which detector modules in the horizontal detector arm are accessible may open downwardly and is preferably covered by a horizontal door, and a window of the vertical detector arm from which detector modules in the vertical detector arm are accessible may open towards an inner side of the passage and is preferably covered by a vertical door.

Further, in an example embodiment, the protective wall comprises four sections: a first protective wall, a second protective wall, a third protective wall, and a fourth protective wall. In the example embodiment, the first protective wall and the second protective wall are respectively connected to both sides of the vertical detector arm along one side of said inspection passage, and the third protective wall and the fourth protective wall are respectively connected to both sides of the accelerator cabin along another opposite side of the inspection passage.

Furthermore, the traction arrangement preferably comprises a rotatable traction arm.

Furthermore, in an example embodiment, the traction arrangement further comprises a machine base, a guide rail mounted on the machine base, a slide cooperating with the guide rail, and a drive arrangement driving the slide to move along the guide rail. In the example embodiment, the traction arm is rotatably connected to the slide via a rotation shaft.

In an example embodiment, the drive arrangement comprises a positive and reverse rotatable decelerating motor mounted on the machine base and its transmission mechanism, the transmission mechanism comprises two chain wheels and a chain cooperating with the two chain wheels, one of the two chain wheels is coupled to an output shaft of the motor, and the slide is connected to the chain.

Furthermore, in the example embodiment, on the slide are mounted a first stop and a second stop limiting the rotation scope of the traction arm, an automatic arm expanding mechanism urging said traction arm to rotate, and a locking arrangement for locking the traction arm.

Furthermore, the automatic arm expanding mechanism may comprise an arm expanding stop mounted on one end of the machine base and an arm expanding pin mounted on the traction arm. The arm expanding stop is provided with a side plane for cooperation with the rotation shaft and a front inclined plane for cooperation with the arm expanding pin.

Furthermore, the locking arrangement may comprise a rotatable block rotatably connected on the slide, and a spring. The ends of the spring may be respectively hooked on one end of the rotatable block and the slide. A locking pin may be provided on one side of the rotatable block adjacent to the spring. The traction arm may be provided with a groove cooperating with the locking pin.

In an example embodiment, an unlocking pressing block is provided on the end of the machine base opposite to the arm expanding stop.

Furthermore, preferable, the rotatable block is a diamond-shaped block, the rotation shaft being located at a central position thereof, and the unlocking pressing block has an inclined surface cooperating with an outer surface of the diamond-shaped block.

Furthermore, said groove is preferably a right-angle groove.

Advantages and positive effects of the trailer security inspection system according to the present invention include that the system comprises protective walls, a radiation imaging system, a horizontal detector arm, a vertical detector arm, and a traction arrangement for hauling the trailer, and that the system is a special apparatus suitable for inspecting a trailer, provides a reliable technical method for conducting a security inspection of luggage, and is adaptable and economical to a large extent.

DETAILED DESCRIPTION

Figure 1:
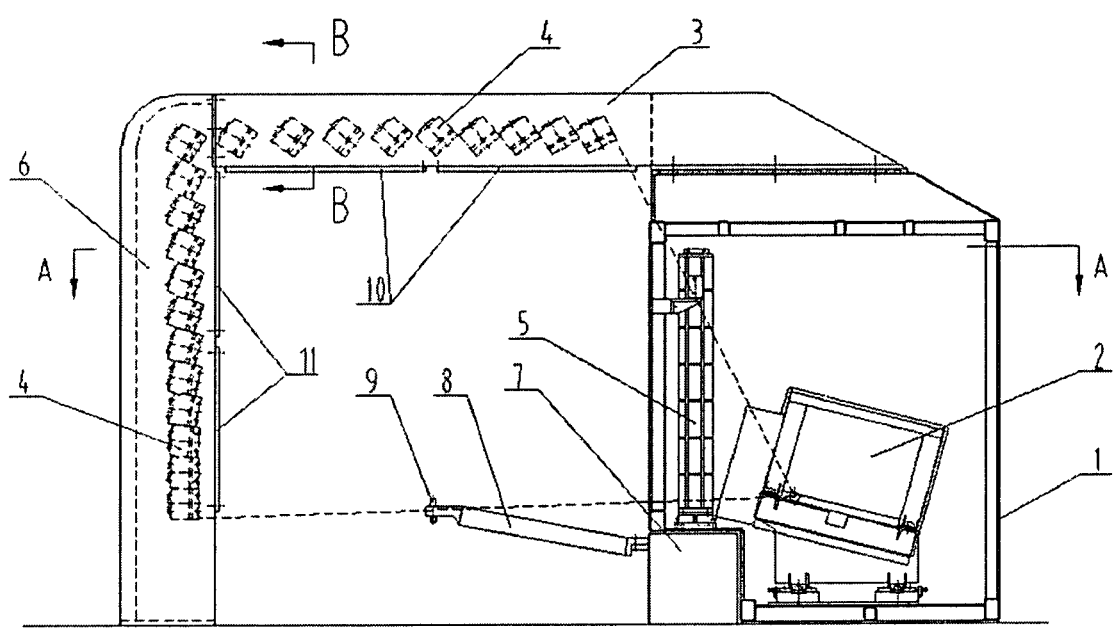
FIG. 1 is a schematic view showing the structure of a trailer security inspection system according to an example embodiment of the present invention.
Figure 2:
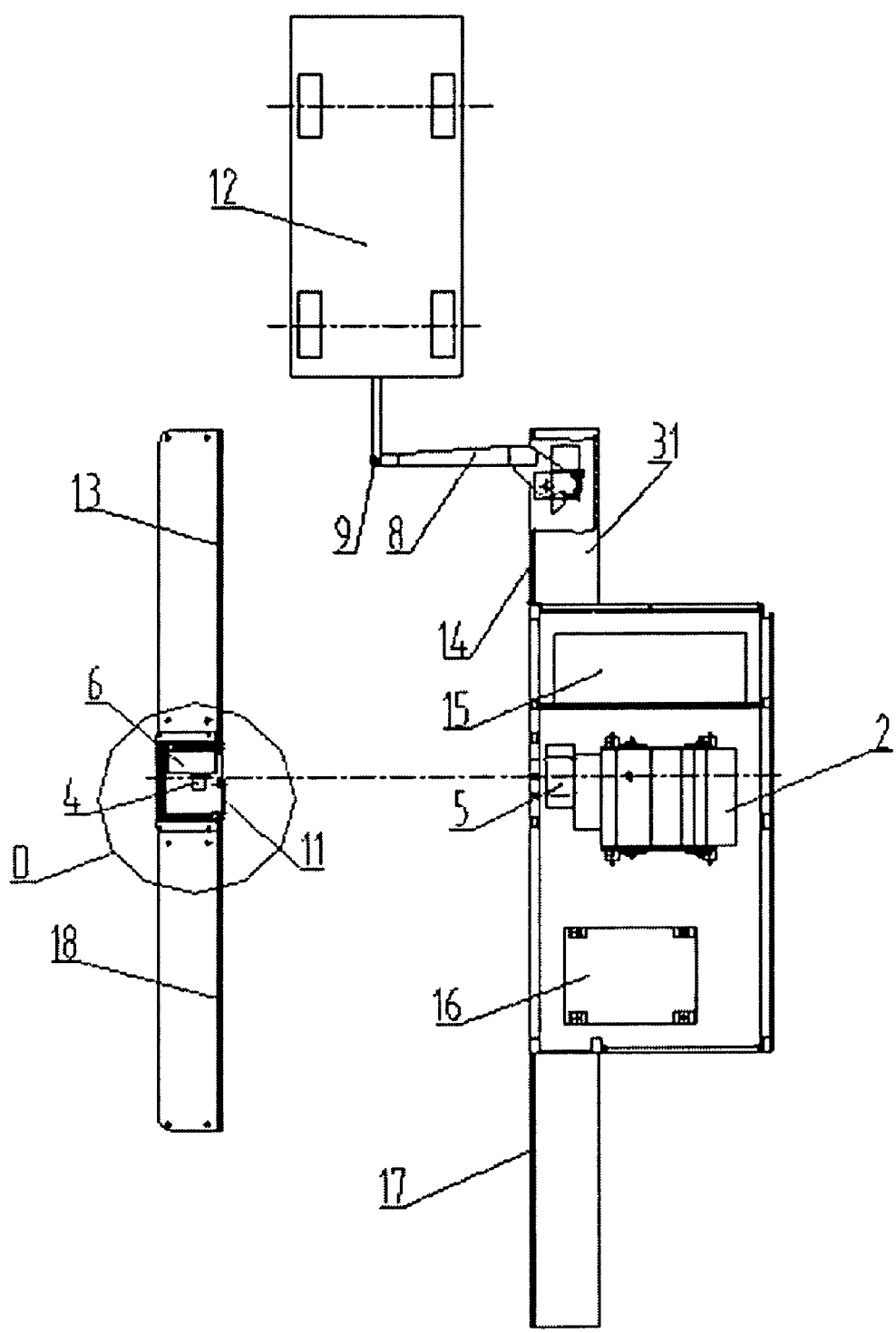
FIG. 2 is a cross sectional view taken along the line A-A of FIG. 1, showing the planar arrangement of an example embodiment of the present invention.
Figure 3:
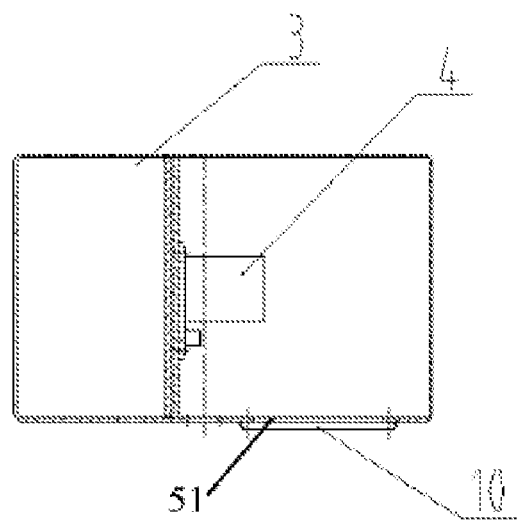
FIG. 3 is a cross sectional view taken along the line B-B of FIG. 1, showing the basic structure of a horizontal detector arm according to an example embodiment of the present invention.
Figure 4:
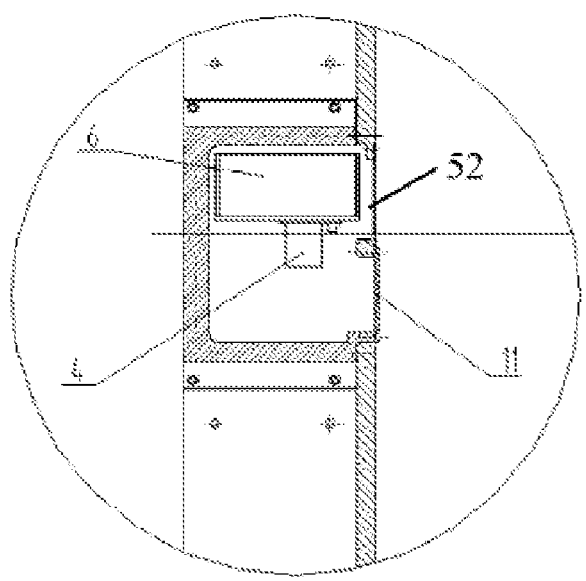
FIG. 4 is an enlarged view of portion D of FIG. 2, showing the basic structure of a vertical detector arm according to an example embodiment of the present invention.

In the figures, the reference numeral designations are as follows. 1 designates an accelerator cabin; 2 designates an accelerator; 3 designates a horizontal detector arm; 4 designates a detector module; 5 designates a collimator; 6 designates a vertical detector arm; 7 designates a traction arrangement; 8 designates a traction arm; 9 designates a traction hook; 10 and 11 each designates a door; 12 designates a trailer; 13 designates a first protective wall; 14 designates a third protective wall; 15 designates an electrical control cabinet; 16 designates a modulator; 17 designates a fourth protective wall; 18 designates a second protective wall; 19 designates an arm expanding stop; 20 designates an arm expanding pin; 31 designates a machine base; 32 designates a decelerating motor; 33 designates a bearing bracket; 34 designates a chain wheel; 35 designates a chain; 36 designates a guide rail; 37 designates a slide; 38 designates a tensioning bolt; 39 designates a rotation shaft; 41 designates a first stop; 42 designates a second stop; 44 designates a locking pin; 45 designates a connecting shaft; 46 designates a rotatable block; 47 designates a spring; and 48 designates a unlocking pressing block.

The following embodiments are used to illustrate the present invention and not to limit the scope of the present invention.

As shown in FIGS. 1 to 4, the trailer security inspection system according to the present invention comprises an accelerator cabin 1 for mounting a radiation imaging system, a protective wall for forming an inspection passage, a horizontal detector arm 3, a vertical detector arm 6, and a traction arrangement for dragging the trailer.

The protective wall comprises four sections: a first protective wall 13, a second protective wall 18, a third protective wall 14 and a fourth protective wall 17. The first protective wall 13 and the second protective wall 18 are respectively connected to the vertical detector arm 6, and the third protective wall 14 and the fourth protective wall 17 are respectively connected to both sides of the accelerator cabin 1. The connection modes of the protective walls to the accelerator cabin 1 and the vertical detector arm 6 omit use of members such as a support rod for supporting the protective wall so that the structure of the system according to the present invention is simple and compact. Certainly, a support member can also be used to mount the protective walls.

One end of the horizontal detector arm 3 is connected to a top of the accelerator cabin, and the other end thereof is connected to the vertical detector arm 6 so that the horizontal detector arm 3 and the vertical detector arm 6 are in an L shape (a person skilled in the art can recognize that the horizontal detector arm 3 and the vertical detector arm 6, as shown in FIG. 1, are in fact formed in an inverted L shape which is however generally called L shape). A plurality of detector modules 4 are respectively mounted in the horizontal detector arm 3 and the vertical detector arm 6. A window 51 of the detector module 4 in the horizontal detector arm 3, at a bottom of the horizontal detector, opens downwardly so that components in the horizontal detector are not exposed through the window 51 at both sides of the horizontal detector that are transverse to the bottom, and therefore do not impart an unpleasant appearance to the horizontal detector at the sides that are transverse to the bottom. Further, opening downwardly can provide a very good water-resistant effect. A horizontal door 10 is closed to cover the window 51. A window 52 of the detector module 4 in the vertical detector arm 6 opens towards the inner side of the passage and a vertical door 11 is closed to cover the window 52.

In the accelerator cabin 1 are mounted an accelerator 2 for generating X-rays with a certain energy and dosage, a collimator 5 for controlling a width of a beam of X rays generated by the accelerator and radiated on a receiving surface of the detector, a modulator 16 for controlling energy and dosage outputted by the accelerator, and an electric control cabinet 15 in which components of a control system are mounted to allow for normal operation of the whole set of the apparatus.

A traction arrangement 7 is mounted at a lower corner of the side adjacent to the accelerator cabin 1 and does not occupy the dimension of the scanning passage.

Figure 5:
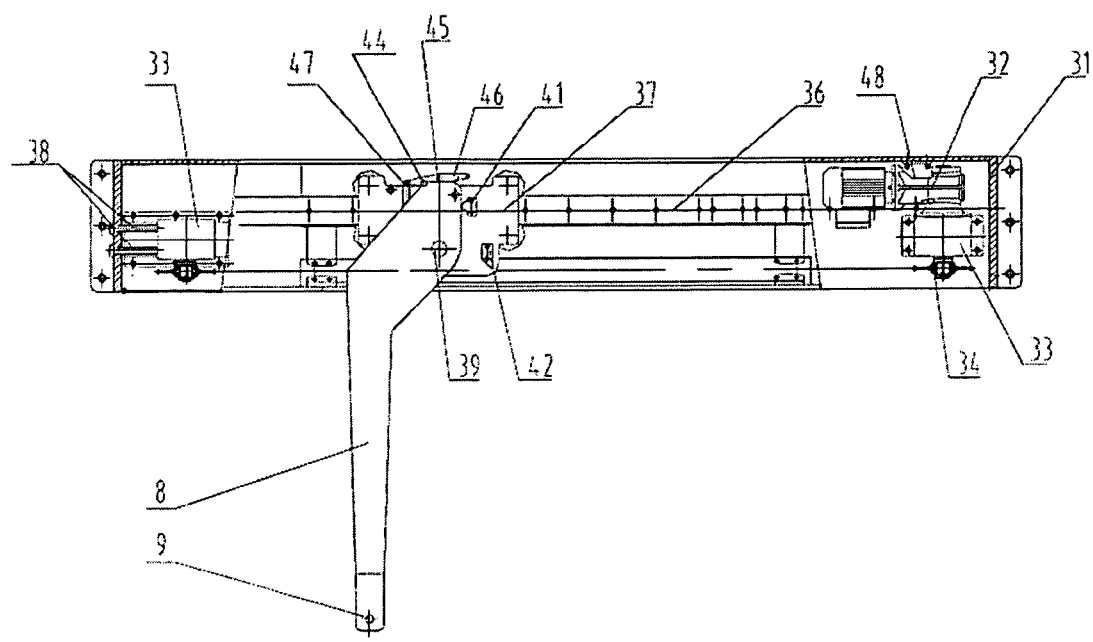
FIG. 5 is a top view of a traction arrangement according to an example embodiment of the present invention.
Figure 6:
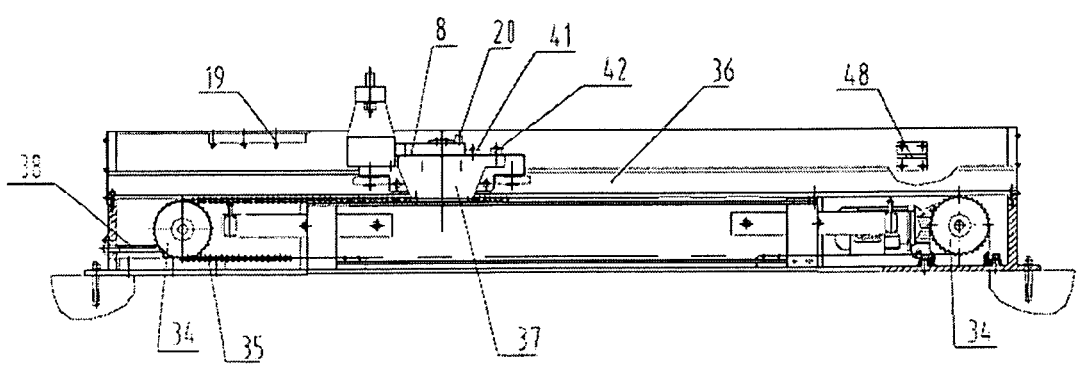
FIG. 6 is a front view of the traction arrangement according to an example embodiment of the present invention.
Figure 7:
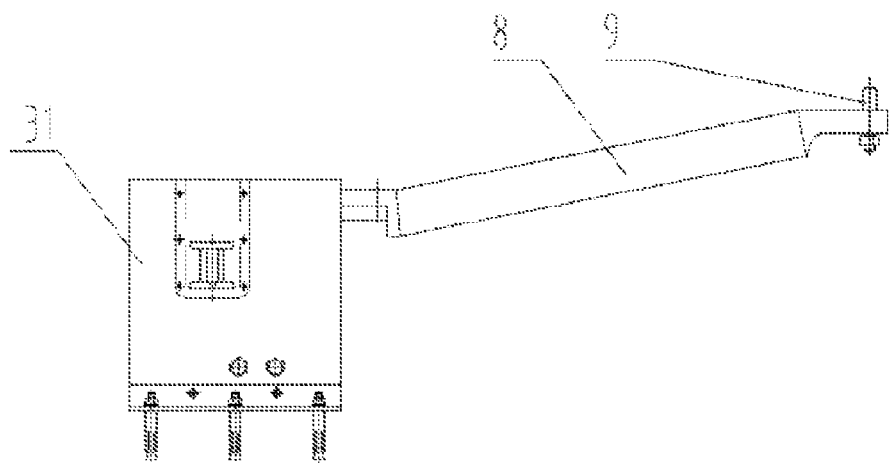
FIG. 7 is a side view of the traction arrangement according to an example embodiment of the present invention.

As shown in FIGS. 5-7, the traction arrangement 7 of the present invention comprises a machine base 31, a drive arrangement mounted on the machine base 31, and a traction arm 8.

The machine base 31 is rectangular parallelepiped, and a guide rail 36 is mounted in a longitudinal direction of its side. A slide 37 is provided on the guide rail 36. The traction arm 8 is connected to the slide 37 via a rotation shaft 39. The slide 37 is provided with a first stop 41, a second stop 42, and a locking arrangement. The first stop 41 and the second stop 42 are used to limit the scope of angle of rotation of the traction arm 8. In the illustrated embodiment, the traction arm 8 can rotate 90° about the rotation shaft 39. A traction hook 9 is mounted at the other end of the traction arm 8 and used to connect the inspected vehicle.

The locking arrangement of the example embodiment of the present invention comprises a rotatable block 46, a spring 47, and a locking pin 44. The rotatable block 46 is a diamond-shaped block and is connected to the slide 37 at a central position thereof via a connecting shaft 45. The ends of the spring 47 are respectively hooked on one end of the rotatable block 46 and the slide 37. The locking pin 44 is provided on the side of the rotatable block 46 adjacent to the spring 47. The fraction arm 8 is provided with a right-angle groove 53. The groove can be an acute angle or a blunt angle. When the locking pin 44 is in the right-angle groove 58, the locking arrangement is in a locked state and the traction arm 8 cannot rotate relative to the slide 37. When the locking pin 44 is in a disengaged state from the right-angle groove 58, the locking arrangement is in an unlocked state and the traction arm 8 can rotate relative to the slide 37.

In the present invention, the unlocking action of the locking arrangement can be realized by an unlocking pressing block 48. The unlocking pressing block 48 is fixed on the machine base 31 at a distal end of the travel of the slide 37. The unlocking pressing block 48 is provided with an inclined surface cooperating with the outer surface of the rotatable block 46. When the unlocking pressing block 48 is in contact and cooperation with the rotatable block 46, the rotatable block 46 is forced to rotate about its central shaft 45 so that the locking pin 44 on the rotatable block 46 is disengaged from the right-angle groove on the traction arm 8 so that the traction arm 8 is in a unlocked state.

Figure 8:
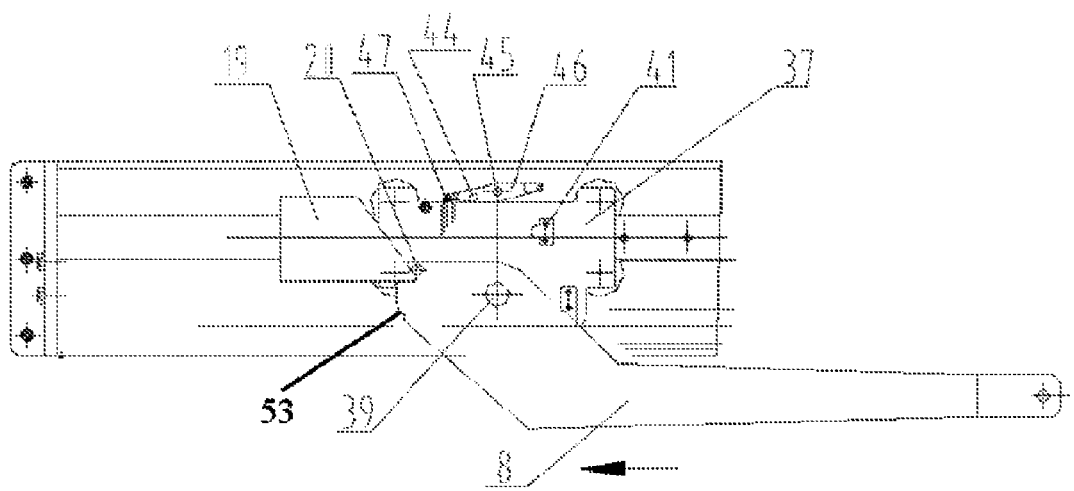
FIG. 8 is a schematic view showing an initial position of a traction arm during automatic deployment, according to an example embodiment of the present invention.
Figure 9:
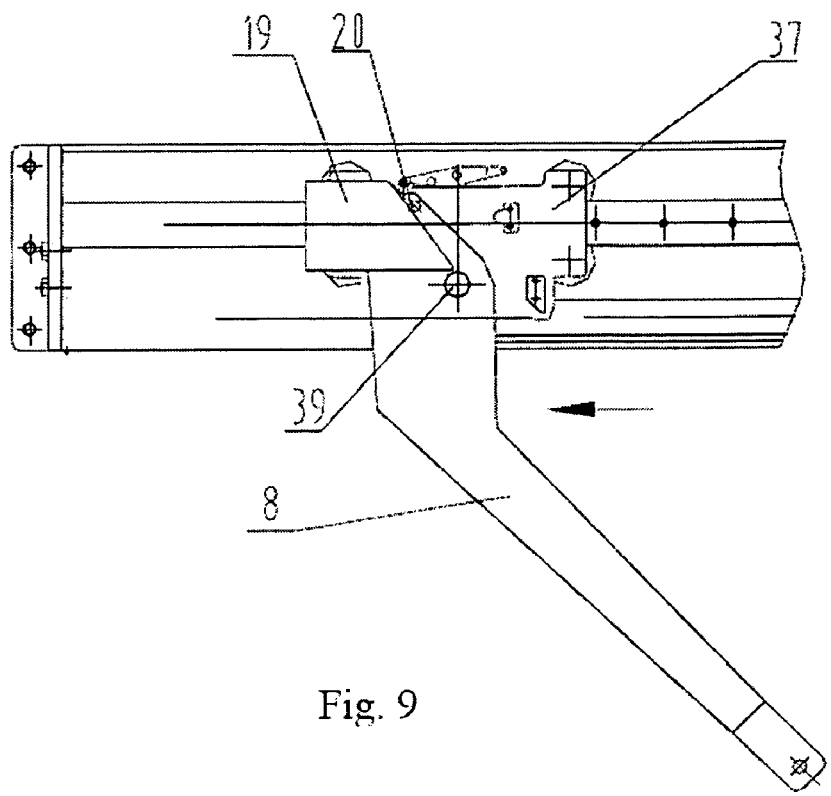
FIG. 9 is a schematic view showing an intermediate position of the traction arm during automatic deployment, according to an example embodiment of the present invention.
Figure 10:
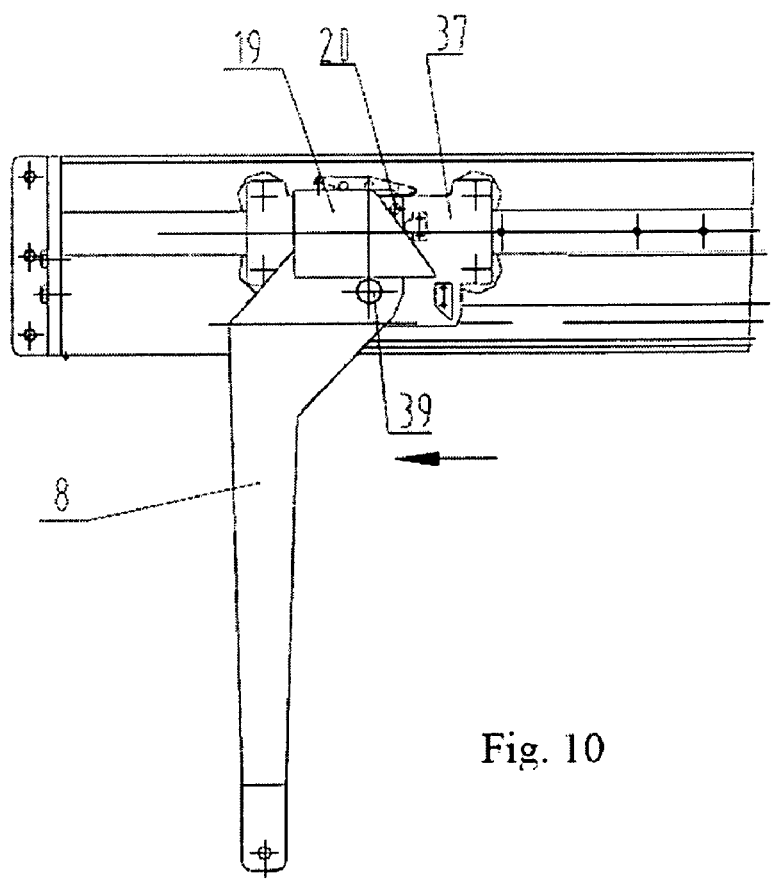
FIG. 10 is a schematic view showing a finished position of the traction arm during automatic deployment, according to an example embodiment of the present invention.

As shown in FIGS. 8-10, the expansion of the automatic arm expanding mechanism according to an example embodiment of the present invention is as follows: the automatic expansion of the traction arm 8 is realized by the interaction of an arm expanding stop 19 and an arm expanding pin 20, wherein the arm expanding stop 19 is fixed on the machine base 31, the arm expanding pin 20 is fixed on the traction arm 8, and the arm expanding stop 19 is provided with a side plane for cooperation with the rotation shaft 39 and a front inclined surface for cooperation with the arm expanding pin 20. When the slide 37 returns to an initial position and before the slide 37 stops, and after the arm expanding stop 19 contacts the arm expanding pin 20, the arm expanding stop 19 blocks further forward movement of the arm expanding pin 20 to urge the traction arm 8 to rotate about the rotation shaft 39. As the slide 37 continues to move forward, the traction arm 8 gradually automatically expands and stops to be perpendicular to the movement direction.

The drive arrangement of the present invention comprises a positive and reverse rotatable decelerating motor 32 mounted on the machine base 31 and its transmission mechanism. The transmission mechanism comprises two chain wheels 34 mounted on both ends of the machine base 31, a chain 35 cooperating with the two chain wheels 34, where one of the two chain wheels is coupled to an output shaft of the motor and where the slide 37 is connected to the chain 35. The tensioning of the chain is effected by a tensioning bolt 38. The tensioning bolt 38 is mounted between the machine base 31 and the bearing bracket 33. The transmission mechanism is not limited to said structure of the embodiment, and other transmission mechanisms such as a gear-rack transmission mechanism or a steel wire cable hoisting transmission mechanism are also adaptable for the present invention.

A working procedure of the trailer security inspection system according to an example embodiment of the present invention is as follows. (1) The traction arm 8 of the traction arrangement is in place at the entrance to the scanning passage, whereupon the traction arm 8 expands to be perpendicular to the scanning movement direction. (2) An operator pulls a trailer 12 to be inspected to the entrance of the scanning passage and hooks the trailer 12 to the traction hook 9. (3) The motor 32 of the traction arrangement is activated, the chain conveyance system works, the slide 37 moves forward under the traction of the chain 35, whereby the traction arm 8 pulls the trailer being inspected through the scanning passage at a predetermined speed. (4) After the traction arrangement pulls the trailer to a prescribed position, the accelerator 2 sends out a beam to scan. On completion of the inspection, the trailer being inspected is pulled to an unloading position. Before the stop of the trailer, the inclined surface of the unlocking pressing block 48 is in contact and cooperation with the inclined surface of the rotatable block 46 so that the rotatable block 46 rotates about the connecting shaft 45, whereby the locking pin 44 is disengaged from the right-angle groove on the fraction arm 8 to open the traction arm 8, whereupon the traction arm 8, due to an external force, can rotate forwardly 90°. (5) When the trailer stops, the operator separates the trailer 12 from the traction arm 8 and rotates the traction arm 8 forwardly a certain angle to pull the trailer 12 away from the scanning region. (6) Then the operation starts a return signal to allow the fraction arm 8 to return to the starting position. (7) When the traction arm 8 moves to the starting position, the traction arm 8, under the action of the arm expanding stop 19, stops after automatically expanding 90°, whereupon the traction arm 8 gets prepared for a next cycle. (8) The operator can pull next trailer 12 to the entrance to the scanning passage for the upcoming inspection.

What is claimed is:

1. A trailer security inspection system, comprising:
    a protective wall forming an inspection passage for passage of a trailer;
    a radiation imaging system effecting a security inspection of the trailer passing through said inspection passage; and
    a traction arrangement adapted for hauling the trailer;
    wherein:
        the traction arrangement comprises:
            a machine base;
            a guide rail mounted on the machine base;
            a slide cooperating with the guide rail;
            a rotatable traction arm rotatably connected to the slide via a rotation shaft; and
            a drive arrangement driving the slide to move along the guide rail;
        the drive arrangement comprises a positive and reverse rotatable decelerating motor mounted on the machine base and a transmission mechanism;
        the transmission mechanism comprises two chain wheels and a chain cooperating with the two chain wheels;
        one of the two chain wheels is coupled to an output shaft of the motor; and
        the slide is connected to the chain.

2. The trailer security inspection system according to claim 1, further comprising:
    an accelerator cabin for mounting an accelerator of said radiation imaging system;
    a horizontal detector arm;
    a vertical detector arm; and
    detector modules of said radiation imaging system mounted in the horizontal and vertical detector arms;
    wherein one end of the horizontal detector arm is connected to a top of the accelerator cabin and another end of the horizontal detector cabin is connected to an upper end of the vertical detector arm.

3. The trailer security inspection system according to claim 1, wherein a window of the horizontal detector arm from which detector modules in the horizontal detector arm are accessible opens downwardly and is covered by a horizontal door, and a window of the vertical detector arm from which detector modules in the vertical detector arm are accessible opens towards an inner side of the passage and is covered by a vertical door.

4. The trailer security inspection system according to claim 1, wherein the protective wall comprises:
    a first protective wall connected to a first side of the vertical detector arm along a first side of the inspection passage;
    a second protective wall connected to a second side of the vertical detector arm along the first side of the inspection passage;
    a third protective wall connected to a first side of the accelerator cabin along a second side of the inspection passage, the second side of the inspection passage being opposite the first side of the inspection passage; and a fourth protective wall connected to a second side of the accelerator cabin along the second side of the inspection passage.

5. A trailer security inspection system, comprising:
a protective wall forming an inspection passage for passage of a trailer;
a radiation imaging system effecting a security inspection of the trailer passing through said inspection passage;
a traction arrangement that is adapted for hauling the trailer and that comprises:
a machine base;
a guide rail mounted on the machine base;
a slide cooperating with the guide rail;
a rotatable fraction arm rotatably connected to the slide via a rotation shaft, wherein, mounted on the slide are first and second stops limiting a rotation scope of the traction arm; and
a drive arrangement driving the slide to move along the guide rail;
an automatic expanding mechanism that urges the traction arm to rotate; and
a locking arrangement adapted for locking the traction arm.

6. The trailer security inspection system according to claim 5, wherein:
the automatic expanding mechanism comprises an arm expanding stop mounted on one end of the machine base and an arm expanding pin mounted on the traction arm;
the arm expanding stop is provided with a side plane for cooperation with the rotation shaft and a front inclined surface for cooperation with the arm expanding pin.

7. The trailer security inspection system according to claim 6, wherein:
the locking arrangement comprises a rotatable block rotatably connected on the slide and a spring, a first end of the spring hooked on one end of the rotatable block and a second end of the spring hooked on the slide;
a locking pin is provided on one side of the rotatable block adjacent to the spring;
the fraction arm is provided with a groove cooperating with the locking pin.

8. The trailer security inspection system according to claim 7, wherein an unlocking pressing block is provided at an end of the machine base opposite to the arm expanding stop.

9. The trailer security inspection system according to claim 7, wherein the rotatable block is a diamond-shaped block having a rotation shaft located at a central position thereof, and the unlocking pressing block has an inclined surface cooperating with an outer surface of the diamond-shaped block.

10. The trailer security inspection system according to claim 7, wherein the groove is a right-angle groove.

11. The trailer security inspection system according to claim 5, further comprising:
an accelerator cabin for mounting an accelerator of said radiation imaging system;
a horizontal detector arm;
a vertical detector arm; and
detector modules of said radiation imaging system mounted in the horizontal and vertical detector arms;
wherein one end of the horizontal detector arm is connected to a top of the accelerator cabin and another end of the horizontal detector cabin is connected to an upper end of the vertical detector arm.

12. The trailer security inspection system according to claim 5, wherein a window of the horizontal detector arm from which detector modules in the horizontal detector arm are accessible opens downwardly and is covered by a horizontal door, and a window of the vertical detector arm from which detector modules in the vertical detector arm are accessible opens towards an inner side of the passage and is covered by a vertical door.

13. The trailer security inspection system according to claim 5, wherein the protective wall comprises:
a first protective wall connected to a first side of the vertical detector arm along a first side of the inspection passage;
a second protective wall connected to a second side of the vertical detector arm along the first side of the inspection passage;
a third protective wall connected to a first side of the accelerator cabin along a second side of the inspection passage, the second side of the inspection passage being opposite the first side of the inspection passage; and
a fourth protective wall connected to a second side of the accelerator cabin along the second side of the inspection passage.

14. A trailer security inspection system, comprising:
an inspection passage;
a radiation imaging system that performs a security inspection of a trailer when the trailer is at a predetermined position within the inspection passage; and
a traction arrangement adapted for hauling the trailer, wherein the traction arrangement includes:
a guide rail;
a slide connected to and slidable along the guide rail;
a traction arm rotatably connected to the slide via a rotation shaft and having mounted thereon a hook;
an automatic expanding mechanism;
a locking mechanism;
an unlocking mechanism; and
a drive arrangement configured to:
drive the slide along the guide rail in a first linear direction towards an entrance of the inspection passage, the driving of the slide in the first direction causing engagement of the traction arm with the automatic expanding mechanism, the engagement with the automatic expanding mechanism causing the traction arm to rotate about the rotation shaft in a first rotating direction towards the entrance until the traction arm is locked in a locked state by the locking mechanism thereby preventing the traction arm from rotating in a second rotating direction reverse of the first rotating direction, the trailer being connectable to the hook when the traction arm is in the locked state; and
subsequent to the locking of the traction arm in the locking position, drive the slide in a second linear direction reverse of the first linear direction towards an unlocking position at which the unlocking mechanism engages the locking mechanism to release the traction arm from the locked state, the driving of the slide causing the traction arm and connected trailer to pass through the predetermined position prior to reaching the unlocking position, the traction arm being rotatable about the rotation shaft in the second rotating direction after release of the traction arm from locked state.

15. The trailer security inspection system according to claim 14, wherein a protective wall forms the inspection passage.

16. The trailer security inspection system according to claim 14, wherein the traction arrangement further comprises a machine base on which the guide rail is mounted.

17. The trailer security inspection system according to claim 16, wherein:

the drive arrangement comprises a positive and reverse rotatable decelerating motor mounted on the machine base and a transmission mechanism;

the transmission mechanism comprises two chain wheels and a chain cooperating with the two chain wheels;

one of the two chain wheels is coupled to an output shaft of the motor; and the slide is connected to the chain.

18. The trailer security inspection system according to claim 14, wherein, mounted on the slide are first and second stops limiting a rotation scope of the traction arm.

19. The trailer security inspection system according to claim 18, wherein:

the traction arrangement further comprises a machine base on which the guide rail is mounted;

the automatic expanding mechanism comprises an arm expanding stop mounted on one end of the machine base and an arm expanding pin mounted on the traction arm;

the arm expanding stop is provided with a side plane for cooperation with the rotation shaft and a front inclined surface for cooperation with the arm expanding pin.

20. The trailer security inspection system according to claim 19, wherein:

the locking mechanism comprises a rotatable block rotatably connected on the slide and a spring, a first end of the spring hooked on one end of the rotatable block and a second end of the spring hooked on the slide;

a locking pin is provided on one side of the rotatable block adjacent to the spring;

the fraction arm is provided with a groove cooperating with the locking pin.

* * * * *

UNITED STATES PATENT AND TRADEMARK OFFICE
CERTIFICATE OF CORRECTION

PATENT NO. : 7,848,485 B2
APPLICATION NO. : 12/274932
DATED : December 7, 2010
INVENTOR(S) : Haifeng Hu et al.

It is certified that error appears in the above-identified patent and that said Letters Patent is hereby corrected as shown below:

Title Page

(30) Foreign Application Priority Data: change
"Nov. 20, 2007 (CN) ............. 2007 1 0177749" to
-- Nov. 20, 2007 (CN)............. 2007 1 0177749.3 --;

Abstract, line 6, change "fraction" to -- traction --;

In the Specification

Column 4, line 60, change "fraction arm" to -- traction arm --;

Column 5, line 66-67, change "fraction arm" to -- traction arm --;

Column 6, line 6, change "fraction arm" to -- traction arm --;

In the Claims

Column 7, line 16, change "fraction arm" to -- traction arm --;

Column 7, line 41, change "fraction arm" to -- traction arm --;

Column 10, line 15, change "fraction arm" to -- traction arm --.

Signed and Sealed this
Fourth Day of June, 2013

Teresa Stanek Rea
*Acting Director of the United States Patent and Trademark Office*